US012183146B2

(12) United States Patent
Nishimura

(10) Patent No.: US 12,183,146 B2
(45) Date of Patent: Dec. 31, 2024

(54) COIN HANDLING APPARATUS AND COIN HANDLING METHOD

(71) Applicant: GLORY LTD., Himeji (JP)

(72) Inventor: Kazuaki Nishimura, Hyogo (JP)

(73) Assignee: GLORY LTD., Himeji (JP)

( * ) Notice: Subject to any disclaimer, the term of this patent is extended or adjusted under 35 U.S.C. 154(b) by 35 days.

(21) Appl. No.: 18/121,020

(22) Filed: Mar. 14, 2023

(65) Prior Publication Data

US 2023/0298422 A1 Sep. 21, 2023

(30) Foreign Application Priority Data

Mar. 16, 2022 (JP) ................................ 2022-041848

(51) Int. Cl.
*G07D 9/00* (2006.01)
*G07F 11/46* (2006.01)

(52) U.S. Cl.
CPC ............ *G07D 9/002* (2013.01); *G07F 11/46* (2013.01)

(58) Field of Classification Search
CPC ........ G07D 9/002; G07D 13/00; G07D 11/00; G07D 11/009; G07F 11/46; G07F 9/06
See application file for complete search history.

(56) References Cited

U.S. PATENT DOCUMENTS 5,938,072 A * 8/1999 Lamoureux ............ G07F 11/44 221/253
6,230,928 B1 * 5/2001 Hanna ................ G07D 11/0087 221/13
9,004,352 B1 * 4/2015 Graef .................... G07F 19/202 235/491
9,830,762 B1 * 11/2017 Blake ..................... G07D 9/008
9,875,593 B1 * 1/2018 Adams ................. G07D 11/235
2008/0265019 A1 * 10/2008 Artino ................ G06Q 20/1085 235/491
2010/0038419 A1 * 2/2010 Blake ........................ G07F 9/08 235/379
2012/0012437 A1 1/2012 Matsumoto
2013/0140358 A1 * 6/2013 Graef .................... G07F 19/201 235/379
2013/0146657 A1 * 6/2013 Graef ..................... G07D 11/14 235/379

(Continued)

FOREIGN PATENT DOCUMENTS

JP 08-287318 11/1996

OTHER PUBLICATIONS

Extended European Search Report for European Patent Application No. 23161777.0 dated Jul. 24, 2023.

*Primary Examiner* — William L Miller
(74) *Attorney, Agent, or Firm* — Amin, Turocy & Watson, LLP

(57) ABSTRACT

A coin handling apparatus includes the following: a cassette attachment unit where a cassette is detachably attached; a coin supply unit that supplies a coin to the cassette; and a control unit that causes the cassette attached to the cassette attachment unit to perform a first confirmation operation for confirming that a coin remains in the cassette when the cassette does not satisfy a predetermined condition, and operates the coin supply unit to supply a coin to the cassette attached to the cassette attachment unit without causing the cassette to perform the first confirmation operation when the cassette satisfies the predetermined condition.

8 Claims, 4 Drawing Sheets

(56) References Cited

U.S. PATENT DOCUMENTS

| | | | | |
|---|---|---|---|---|
| 2014/0166745 | A1* | 6/2014 | Graef | G07F 19/00 235/379 |
| 2018/0005479 | A1* | 1/2018 | Kojima | G07D 9/00 |
| 2018/0108199 | A1* | 4/2018 | Blake | G07D 9/00 |
| 2019/0073851 | A1* | 3/2019 | Umeda | G07D 3/14 |
| 2021/0390815 | A1 | 12/2021 | Nishimura | |
| 2022/0172547 | A1* | 6/2022 | Tanaka | G07D 9/002 |
| 2024/0185665 | A1* | 6/2024 | Gates | G07F 17/20 |

* cited by examiner

COIN HANDLING APPARATUS AND COIN HANDLING METHOD

CROSS REFERENCE TO RELATED APPLICATIONS

This application is entitled to and claims the benefit of Japanese Patent Application No. 2022-041848, filed on Mar. 16, 2022, the disclosure of which including the specification, drawings and abstract is incorporated herein by reference in its entirety.

TECHNICAL FIELD

The present disclosure relates to a coin handling apparatus and a coin handling method.

BACKGROUND ART

As disclosed in Patent Literature (hereinafter, referred to as PTL) 1, for example, a coin handling apparatus for handling coins is known.

CITATION LIST

Patent Literature

PTL 1

Japanese Patent Application Laid-Open No. H08-287318

SUMMARY OF INVENTION

Technical Problem

In recent years, it has been proposed to use a cassette that stores coins for transferring coins between a plurality of coin handling apparatuses. The shorter the time required to transfer coins from a coin handling apparatus to a cassette, the better.

An object of the present disclosure is to provide a money handling apparatus and a money handling method both capable of completing the transferring of coins to a cassette in a short time.

Solution to Problem

A coin handling apparatus according to the present disclosure comprises: a cassette attachment unit where a cassette is configured to be attached; a coin supply unit configured to supply a coin to the cassette; and a control unit that causes the cassette attached to the cassette attachment unit to perform a first confirmation operation when the cassette does not satisfy a predetermined condition, the first confirmation operation being an operation for confirming that a coin remains in the cassette, and operates the coin supply unit to supply a coin to the cassette attached to the cassette attachment unit without causing the cassette to perform the first confirmation operation when the cassette satisfies the predetermined condition. The first confirmation operation may be an operation of confirming whether or not a coin remain in the cassette.

The cassette may comprise a conveyor for transporting coins in the cassette and a sensor for detecting a coin in the cassette.

The first confirmation operation may be the operation of a conveyor for transporting a coin to a detection area of the sensor.

When an error occurs in the coin supply unit or the cassette while a coin is being supplied from the coin supply unit to the cassette, the control unit may cause the cassette to perform a second confirmation operation different from the first confirmation operation, the second confirmation operation being for confirming that a coin remains in the cassette. The second confirmation operation may be an operation of confirming whether or not a coin remains in the cassette.

The second confirmation operation may be a combination of an operation of the conveyor for transporting a coin in a first direction toward the detection area of the sensor and an operation of the conveyor for transporting a coin in a second direction different from the first direction.

The control unit may be configured to be able to acquire the inventory amount in the cassette.

When the sensor detects a coin as a result of the first confirmation operation even though the inventory amount is 0, the control unit may generate a signal to notify that the coin has been detected.

The control unit may be configured to be able to acquire the inventory amount from a memory comprised in the cassette.

The predetermined condition may be a condition such that the cassette is attached to a cassette attachment unit within a predetermined time after the cassette was last emptied (i.e. the last emptying of the cassette). In addition, the predetermined condition may be a condition such that the cassette is attached to the cassette attachment unit of the coin handling apparatus that has last emptied the cassette. The predetermined condition may be a condition such that both of these conditions are satisfied.

A coin handling method according to the present disclosure is performed by a coin handling apparatus configured to supply a coin to a cassette, and the coin handling method comprises: determining whether or not the cassette attached to a cassette attachment unit satisfies a predetermined condition; causing the cassette to perform a first confirmation operation for confirming that a coin remains in the cassette when the cassette does not satisfy the predetermined condition; and supplying a coin to the cassette without causing the cassette to perform the first confirmation operation when the cassette satisfies the predetermined condition.

Advantageous Effects of Invention

The present disclosure can provide a money handling apparatus and a money handling method both capable of completing the transferring of coins to a cassette in a short time.

DESCRIPTION OF EMBODIMENTS

Hereinafter, an embodiment according to one aspect of the present disclosure will be described with reference to the drawings.

Figure 1:
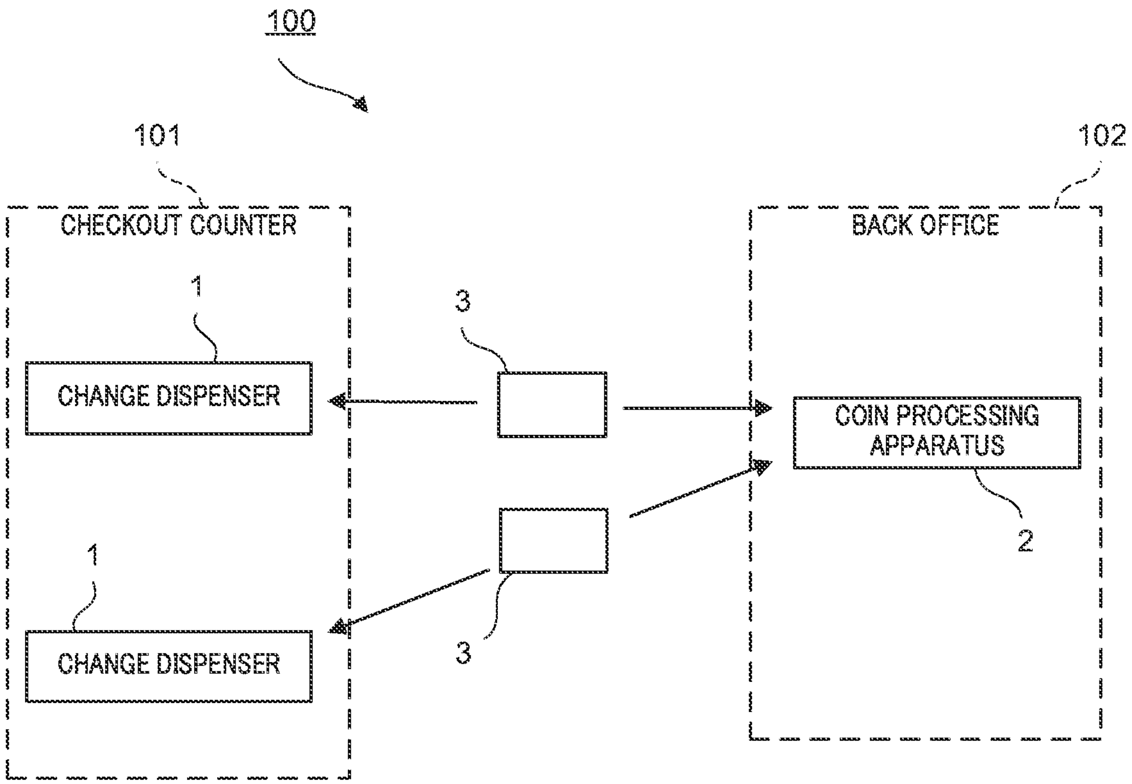
FIG. 1 is a schematic diagram illustrating a coin handling system according to an embodiment.

FIG. 1 is a schematic diagram illustrating a coin handling system 100. The coin handling system 100 comprises change dispensers 1, a coin handling apparatus 2, and cassettes 3.

The change dispenser 1 is disposed at a checkout counter 101. A plurality of change dispensers 1 may be disposed at the checkout counter 101. The change dispenser 1 is connected to a POS terminal, a kiosk terminal, or the like, and dispenses banknotes and coins as change necessary for settlement of the purchase price of merchandise.

The coin handling apparatus 2 is disposed in a back office 102. The coin handling apparatus 2 stores coins collected from the change dispenser 1 and dispenses a change fund required by the change dispenser 1.

The cassette 3 is a container used for transferring coins between the change dispensers 1 and the coin handling apparatus 2. The number of cassettes 3 in the coin handling system 100 may be one, or two or more. In addition, a plurality of change dispensers 1 may share single cassette 3.

For example, when the proceeds from sales of a day after the business for the day is finished are transferred from the change dispenser 1 to the coin handling apparatus 2, the cassette 3 is attached to the change dispenser 1 and the coins in the change dispenser 1 are transferred to the cassette 3. The cassette 3 with the coins stored therein is then attached to the coin handling apparatus 2, and the coins are transferred from the cassette 3 to the coin handling apparatus 2. At this time, the cassette 3 is emptied.

In addition, for example, for transferring a change fund from the coin handling apparatus 2 to the change dispenser 1 before the start of business for a day, the cassette 3 is attached to the coin handling apparatus 2 and coins in the coin handling apparatus 2 are transferred to the cassette 3. The cassette 3 with the coins stored therein is then attached to the change dispenser 1, and the coins are transferred from the cassette 3 to the change dispenser 1.

Figure 2:
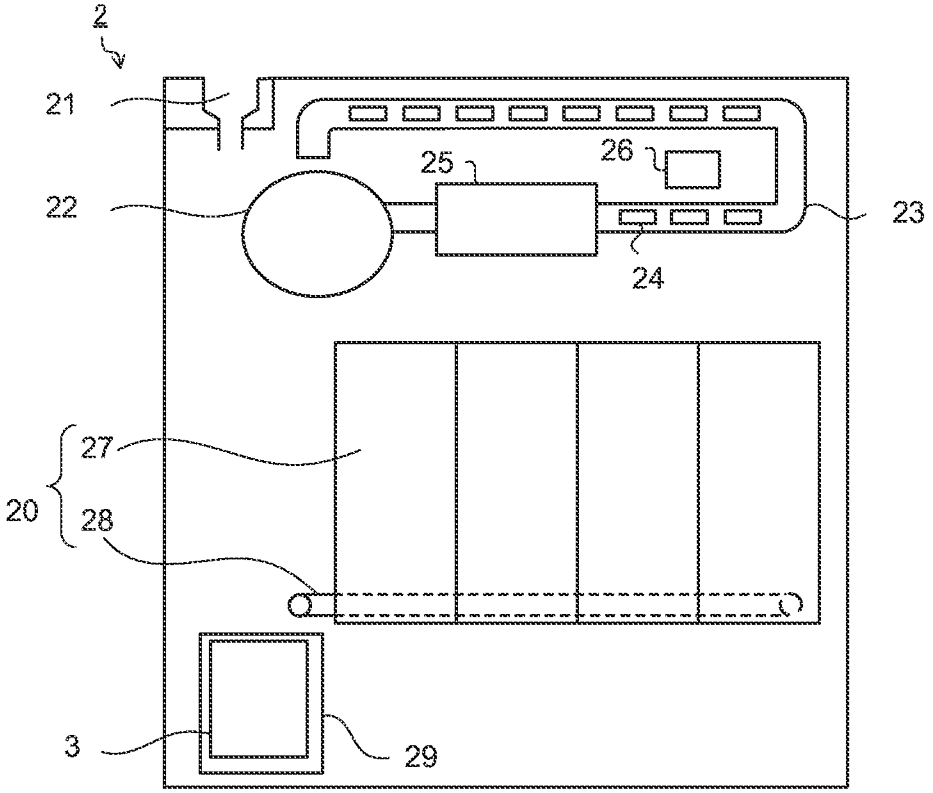
FIG. 2 is a schematic diagram illustrating a coin handling apparatus.

FIG. 2 is a schematic diagram illustrating the coin handling apparatus 2. The coin handling apparatus 2 comprises a deposit unit 21, a rotating disc 22, and a transport unit 23. The deposit unit 21 is configured to allow the cassette 3 to be detachably attached thereto and to receive coins from the cassette 3. The deposit unit 21 may be configured to accept loose coins that are manually deposited. The rotating disc 22 is configured to supply the coins deposited from the deposit unit 21 one by one to the transport unit 23. The transport unit 23 is configured to transport coins one by one.

The coin handling apparatus 2 comprises a plurality of diversion units 24, a recognition unit 25, and a control unit 26. The plurality of diversion units 24 are configured to be able to switch the transport path on which coins are transported by the transport unit 23. The recognition unit 25 recognizes coins being transported by the transport unit 23. The recognition unit 25 recognizes, for example, the authenticity, denomination, and fitness of the coins. The control unit 26 controls the diversion unit 24 based on the recognition result of the recognition unit 25 to switch the destination of each coin according to its denomination.

The coin handling apparatus 2 comprises a plurality of storage units 27 and a discharge unit 28. Each storage unit 27 is configured to store coins transported through the transport path correspondingly switched by the diversion unit 24. The plurality of storage units 27 each store sorted coins in a corresponding denomination. In addition, each storage unit 27 is configured to be able to discharge the stored coins one by one onto the discharge unit 28. The discharge unit 28 is configured by, for example, a conveyor belt, and transports the coins discharged from the storage unit 27.

The coin handling apparatus 2 comprises a cassette attachment unit 29. The cassette attachment unit 29 is configured in such a way that the cassette 3 can be attached thereto and the cassette 3 can be detached therefrom. In other words, the cassette attachment unit 29 is configured in such a way that the cassette 3 can be detachably attached thereto. A lower unit of the coin handling apparatus 2 may comprise the cassette attachment unit 29. The lower unit may be configured in such a way that the lower unit can be pulled out from the coin handling apparatus 2 or pushed into the coin handling apparatus 2.

The storage units 27 and the discharge unit 28 form a coin supply unit 20. The coin supply unit 20 is configured to supply coins to the cassette 3 attached to the cassette attachment unit 29.

Figure 3:
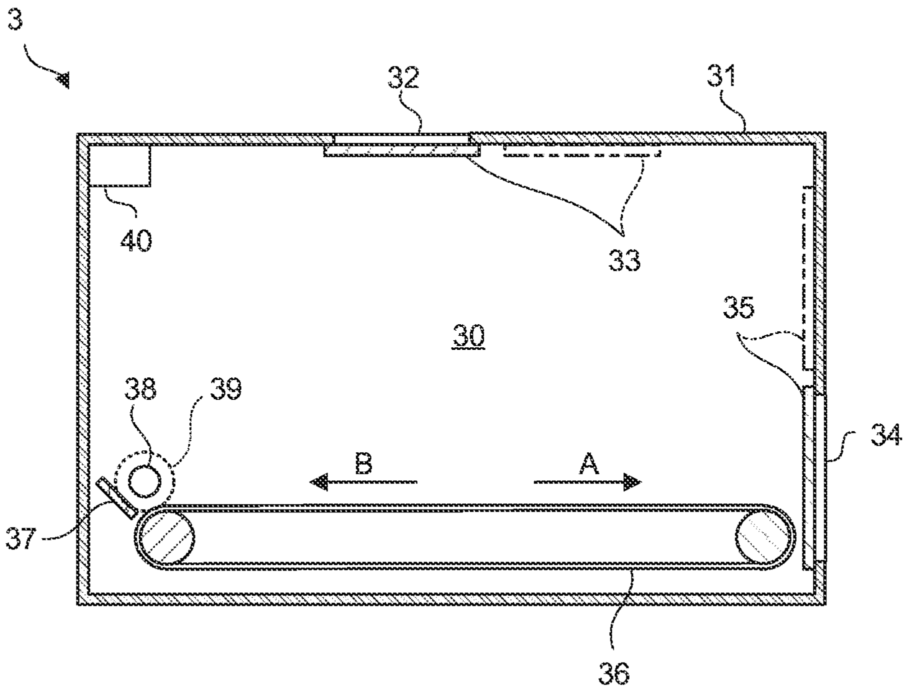
FIG. 3 is a schematic diagram illustrating a cassette.

FIG. 3 is a schematic diagram illustrating the cassette 3. The cassette 3 comprises a housing 31 surrounding a storage space 30. An inlet 32 is formed on the upper surface of the housing 31. The cassette 3 comprises a shutter 33 for the inlet (herein also referred to as "inlet shutter") for opening and closing the inlet 32. An outlet 34 is formed on the side surface of the housing 31. The cassette 3 comprises a shutter 35 for the outlet (herein also referred to as "outlet shutter") for opening and closing the outlet 34. An inlet shutter 33 opens the inlet 32 when coins are supplied to the cassette 3, and otherwise closes the inlet 32. The outlet shutter 35 opens the outlet 34 when coins are discharged from the cassette 3, and otherwise closes the outlet 34.

The cassette 3 comprises a conveyor 36, a fall prevention plate 37, and a sensor 38. The conveyor 36 forms the bottom portion of the storage space 30 and supports coins—entering the storage space 30—from the inlet 32, from below. The conveyor 36 comprises an endless belt and is configured to rotate in both forward and reverse directions. When the conveyor 36 rotates in the forward direction, coins move in the forward direction (direction A in FIG. 3), and when the conveyor rotates in the reverse direction, coins move in the reverse direction (direction B in FIG. 3). The conveyor 36 discharges coins out of the cassette 3 through the outlet 34 by moving the coins in the forward direction. The fall prevention plate 37 is disposed on the opposite side from the outlet 34 with the conveyor 36 located therebetween. The fall prevention plate 37 is inclined in such a way that the further from the bottom, the further from the outlet 34. In addition, the fall prevention plate 37 is disposed in such a way that the lower end thereof faces the surface of the conveyor 36 with a gap through which coins cannot pass. The fall prevention plate 37 prevents coins from falling from the top of the conveyor 36. The sensor 38 is configured to detect coins placed on the conveyor 36, and is, for example, an optical sensor comprising a light-emitting portion and a light-receiving portion. The sensor 38 is disposed in such a way that the detection area 39 of the sensor 38 is positioned on the opposite side from the outlet 34 with the conveyor 36 located therebetween. The conveyor 36 moves coins, which the conveyor supports, into the detection area 39 by moving the coins in the reverse direction.

The conveyor 36 and the fall prevention plate 37 may face each other so as to form a V-shaped recess as illustrated in FIG. 3. In addition, the sensor 38 may be disposed in such a way that the detection area 39 includes this V-shaped recess. Such a configuration can obtain the following advantages. By rotating the conveyor 36 in the reverse direction when a few (for example, one) coins are on the conveyor 36, the coin can be erected in the V-shaped recess (surface contact between the coin and the conveyor 36 is released). The sensor 38 thus can detect coins without fail.

The cassette 3 is configured to be able to receive electric power supply from the coin handling apparatus 2 when the cassette is attached to the cassette attachment unit 29. This electric power operates the inlet shutter 33, the outlet shutter 35, the conveyor 36, and the sensor 38. When the cassette 3 is attached to the cassette attachment unit 29, the coin handling apparatus 2, specifically the control unit 26, controls the cassette 3. That is, the sensor 38 transmits the detection result to the control unit 26, and the inlet shutter 33, the outlet shutter 35, and the conveyor 36 receive control signals from the control unit 26.

The cassette 3 comprises a memory 40. The memory 40 stores the inventory amount in the cassette 3, that is, the total denomination value of the coins stored in the cassette 3. The memory 40 also stores information indicating the state of the cassette 3. The information indicating the inventory amount in the cassette 3 and the state of the cassette 3 is written in the memory 40 by the control unit of the change dispenser 1 or the control unit 26 of the coin handling apparatus 2 when the cassette 3 is attached to the change dispenser 1 or the coin handling apparatus 2. Examples of the information indicating the state of the cassette 3 includes information indicating whether or not the cassette 3 is in a state that requires a detailed examination, information specifying an apparatus that last emptied the cassette 3, and information indicating the last time the cassette 3 was emptied.

Figure 4:
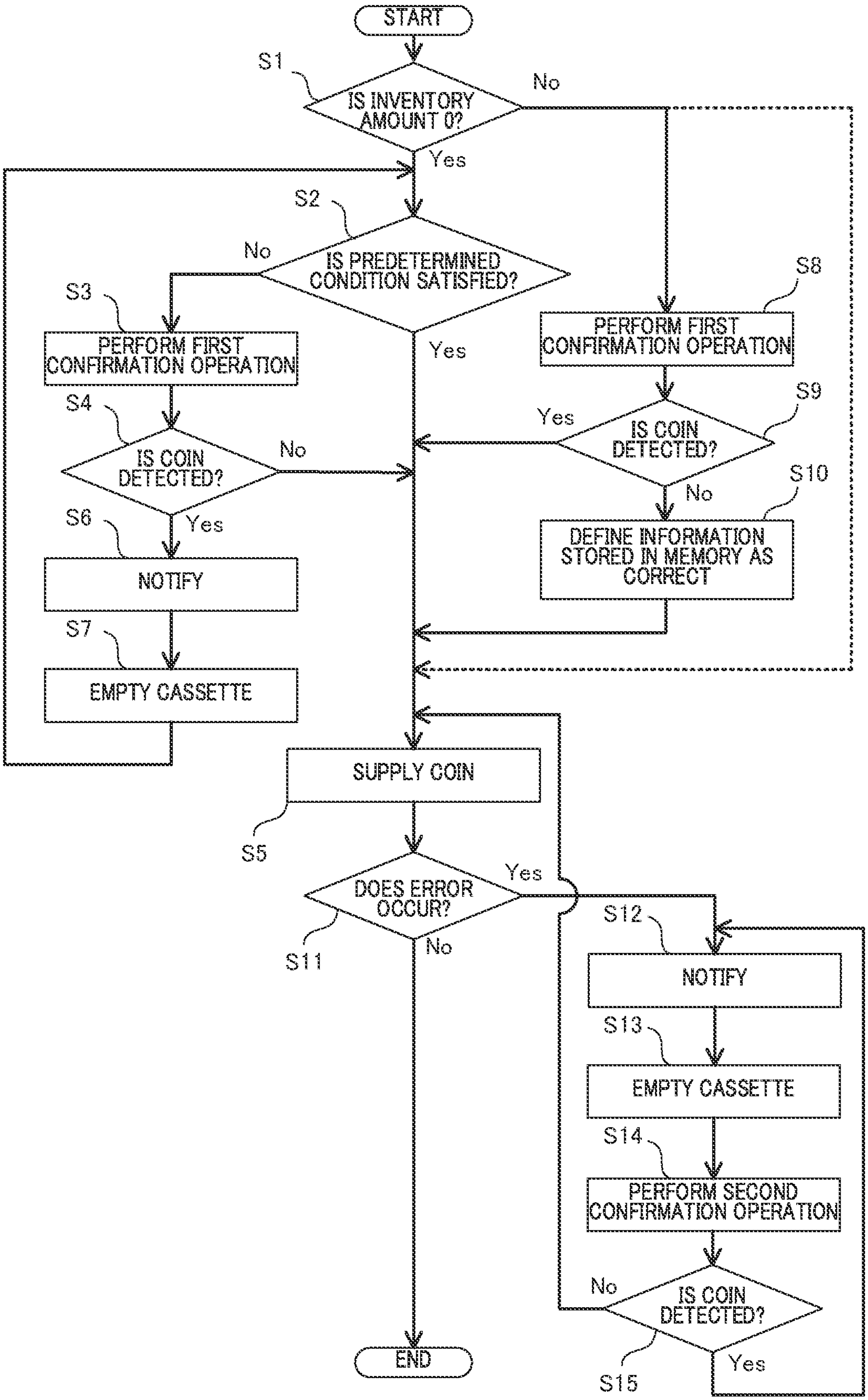
FIG. 4 is a flow chart of a coin handling method.

In the following, the operation of the coin handling apparatus 2 when coins are supplied from the coin handling apparatus 2 to the cassette 3 will be described with reference to FIG. 4. FIG. 4 is a flow chart of a coin handling method performed when coins are supplied from the coin handling apparatus 2 to the cassette 3.

When the cassette 3 is attached to the cassette attachment unit 29, the control unit 26 decides whether or not the inventory amount in the cassette 3 is 0 (S1). That is, the control unit 26 decides whether or not the cassette 3 is empty. The inventory amount in the cassette 3 can be acquired from the memory 40.

When the inventory amount in the cassette 3 acquired from the memory 40 is 0 (Yes in S1), the control unit 26 of the coin handling apparatus 2 determines whether or not a predetermined condition is satisfied (S2). The predetermined condition is such that the probability that the cassette 3 is empty can be determined to be high. The operation of supplying coins to the cassette 3 whose inventory amount is 0, that is, to the empty cassette 3 is performed, for example, for depositing coins into the cassette 3 as a change fund. A determination as to whether or not the predetermined condition is satisfied may be performed when the lower unit comprising the cassette attachment unit 29 is pulled out from the coin handling apparatus 2, the cassette 3 is attached to the cassette attachment unit 29, and the position of the lower unit is returned (when the lower unit is pushed into the coin handling apparatus 2). Alternatively, the determination as to whether or not the predetermined condition is satisfied may be performed when coins are supplied from the coin supply unit to the cassette 3.

When the predetermined condition is not satisfied (No in S2), there is a possibility that the cassette 3 is not empty, so a simple check is performed to confirm whether or not a coin remains in the cassette 3. That is, the control unit 26 causes the cassette 3 to perform the first confirmation operation (S3). The first confirmation operation is, for example, an operation of rotating the conveyor 36 in the reverse direction. When a coin (herein, "a coin" includes a plurality of coins, and the number of "coins" may be one) remains in the cassette 3, the coin can be detected with the sensor 38 by rotating the conveyor 36 in the reverse direction to move the coin on the conveyor 36 into the detection area 39 of the sensor 38. The time for rotating the conveyor 36 in the reverse direction may be the time required for the endless belt of the conveyor 36 to make about a half turn (for example, 2 seconds). When the endless belt makes a half turn, even a coin in the vicinity of the outlet 34 can be brought into the detection area 39. That is, when a coin remains on the conveyor 36, the coin can be moved into the detection area 39 without fail by rotating the endless belt halfway. The coin that has moved into the detection area 39 continues to stay on the conveyor 36 and within the detection area 39 due to the fall prevention plate 37.

As a result of the first confirmation operation, when the sensor 38 does not detect any coins, it can be determined that no coins remain, and when the sensor 38 detects a coin, it can be determined that a coin remains.

Therefore, when the sensor 38 does not detect any coins during the first confirmation operation (No in S4), the control unit 26 operates the coin supply unit 20, following the first confirmation operation, to supply coins from the coin supply unit 20 to the cassette 3 (S5).

When the sensor 38 detects a coin during the first confirmation operation (Yes in S4), the control unit 26 generates a signal to notify that a coin has been detected, and transmits this signal to a notification apparatus capable of alerting an operator. The notification apparatus notifies that a coin has been detected upon receiving this signal (S6). The notification apparatus is, for example, a display, a warning light, or a speaker comprised in the coin handling apparatus 2, or a computer communicably connected to the coin handling apparatus 2.

As the operator is notified by the notification apparatus that a coin remains in the cassette 3, the operator can detach the cassette 3 from the cassette attachment unit 29 to empty the cassette 3 (S7). Further, the operator can attach the cassette 3 to the cassette attachment unit 29 again after emptying the cassette 3. Subsequently, the control unit 26 again determines whether or not the predetermined condition is satisfied (S2). The emptying of the cassette 3 is, for example, attaching cassette 3 to the deposit unit 21 and transferring a coin from the deposit unit 21 to the coin handling apparatus 2.

When the predetermined condition is satisfied (Yes in S2), it can be determined that the cassette 3 is empty, that is, no coins remain in the cassette 3. Therefore, the control unit 26 operates the coin supply unit 20 to supply coins from the coin supply unit 20 to the cassette 3 without causing the cassette 3 to perform the first confirmation operation (S5).

By operating as described above, the coin handling apparatus 2 supplies coins to the cassette 3 without performing any prior check at all when the probability that the cassette 3 is empty is high. In addition, even when there is a possibility that the cassette 3 is not empty, the coin handling apparatus 2 supplies coins to the cassette 3 with performing only a simple check that can be completed in a short time. Therefore, the coin handling apparatus 2 can complete the transferring of coins to the cassette 3 in a short time. As the number of change dispensers 1 increases and the number of cassettes 3 into which change funds are to be placed increases, the effect of shortened waiting time for the transferring of coins to the cassettes 3 in a short time is increased.

As described above, the predetermined condition is such that the probability that the cassette 3 is empty can be determined to be high. Examples of the predetermined condition include a condition such that a detailed examination of the cassette 3 is not required, a condition such that the apparatus that last emptied the cassette 3 is the coin handling apparatus 2 itself, and a condition such that a predetermined time has not passed since cassette 3 was last emptied.

The condition such that a detailed examination of the cassette 3 is not required is satisfied by no information being written in the memory 40 comprised in the cassette 3—the information indicating that the detailed examination of the cassette 3 is required. Such information indicating that a detailed examination of the cassette 3 is required is written in the memory 40 by the change dispenser 1. Example of the cases in which such information is written include the following cases: coins have been completely transferred from the cassette 3 to the change dispenser 1, but a transport error occurs during the transfer; coins cannot be completely transferred from the cassette 3 to the change dispenser 1; and a transport error occurs while coins are being transferred from the change dispenser 1 to the cassette 3.

The condition such that the apparatus that last emptied the cassette 3 is the coin handling apparatus 2 itself is satisfied by the number specifying the coin handling apparatus 2 being written in the memory 40 comprised in the cassette 3 as the number specifying the apparatus that last emptied the cassette 3. The number specifying an apparatus is, for example, the apparatus number or the apparatus ID. Here, an exemplary case is assumed as follows: at the end of business for a day, proceeds from sales are collected from the change dispenser 1 into the cassette 3 and the proceeds from sales are deposited in the coin handling apparatus 2 from the deposit unit 21. At this time, the coin handling apparatus 2 writes its own number in the memory 40. In the next morning, when the cassette 3 is attached to the cassette attachment unit 29 in order to replenish the cassette 3 with a change fund from the coin handling apparatus 2, the coin handling apparatus 2 obtains from the memory 40 a number specifying the apparatus that last emptied the cassette 3. When the acquired number is the number of the coin handling apparatus 2, the condition such that the apparatus that last emptied the cassette 3 is the coin handling apparatus 2 itself is satisfied.

The condition such that a predetermined time has not passed since the cassette 3 was last emptied is satisfied by the predetermined time having not passed at the time when the cassette 3 is attached to the cassette attachment unit 29 since the last time the cassette 3 was emptied. An apparatus that empties the cassette 3 writes the time (i.e., date and time) in the memory 40 each time the apparatus empties the cassette. When a certain amount of time has passed since the last written time, that is, since cassette 3 was last emptied, there is a possibility that some event has occurred in the cassette 3 and a coin have entered the cassette 3 during the certain amount of time. Therefore, by satisfying the condition such that the predetermined time has not passed since cassette 3 was last emptied, it can be determined that the probability that the cassette remains empty is high. The predetermined time may be, for example, one month or one year.

In the following, the operation to be performed when the inventory amount in the cassette 3 acquired from the memory 40 is not 0 will be described. This operation is performed, for example, when the cassette 3 is additionally replenished with a change fund during business hours.

When the inventory amount in the cassette 3 acquired from the memory 40 is not 0 (No in S1), a first confirmation operation, which is a simple check for confirming whether or not a coin remains in the cassette 3, may be performed (S8).

As a result of the first confirmation operation, when the sensor 38 detects a coin (Yes in S9), the detection result matches the information in the memory 40 indicating that the inventory amount is not zero. Therefore, following the first confirmation operation, the control unit 26 operates the coin supply unit 20 to supply coins from the coin supply unit 20 to the cassette 3 (S5). At this time, the control unit 26 writes in the memory 40 the sum of the total denomination value of the coins supplied to the cassette 3 and the inventory amount stored in the memory 40 as a new inventory amount.

As a result of the first confirmation operation, when the sensor 38 does not detect any coins (No in S9), the detection result does not match the information in the memory 40 indicating that the inventory amount is not zero. However, the first confirmation operation is an operation of a simple check; therefore, the absence of coins in the cassette 3 cannot be fully guaranteed on the basis that the sensor 38 does not detect any coins during the first confirmation operation. Therefore, in this case, the process such that the inventory amount stored in the memory 40 is defined as correct (S10). Subsequently, the control unit 26 operates the coin supply unit 20 to supply coins from the coin supply unit 20 to the cassette 3 (S5). At this time, the control unit 26 writes in the memory 40 the sum of the total denomination value of the coins supplied to the cassette 3 and the inventory amount stored in the memory 40 as a new inventory amount.

When the inventory amount in the cassette 3 acquired from the memory 40 is not 0, the control unit 26 may operate the coin supply unit 20 to supply coins from the coin supply unit 20 to the cassette 3 without causing the cassette 3 to perform the first confirmation operation (see the broken line in FIG. 4).

Regardless of the inventory amount in the cassette 3 before the supplying of coins to the cassette 3, when an error occurs while coins are being supplied to the cassette 3, the processing of supplying coins to the cassette 3 may be continued as described below. The error in the present embodiment is an error such as a coin jam in the coin supply unit 20 or in the cassette 3.

When an error such as a coin jam does not occur while coins are being supplied from the coin supply unit 20 to the cassette 3 (S5) (No in S11), the supplying of coins from the coin supply unit 20 to the cassette 3 is completed.

When an error such as a coin jam occurs while coins are being supplied from the coin supply unit 20 to the cassette 3 (Yes in S11), the control unit 26 may generate a signal to notify that the error has occurred and send this signal to the notification apparatus. The notification apparatus may notify that an error has occurred upon receiving this signal (S12).

As the operator is notified by the notification apparatus that an error has occurred, the operator can detach the cassette 3 from the cassette attachment unit 29 to empty the cassette 3 (S13). Further, the operator can attach the cassette 3 to the cassette attachment unit 29 again after emptying the cassette 3.

Subsequently, the control unit 26 may cause the cassette 3 to perform a second confirmation operation that is different from the first confirmation operation (S14). The second confirmation operation is a combination of the operation of the conveyor 36 that moves coins toward the outlet 34 (that is, forward rotation) and the operation of the conveyor 36 that moves coins toward the detection area 39 of the sensor 38 (that is, reverse rotation). The second confirmation operation may be an operation of rotating the conveyor 36 in the forward and reverse directions a plurality of times. The sensor 38 can detect any coins remaining in the cassette 3 without fail by alternately rotating the conveyor 36 forward and backward a plurality of times. In other words, the second confirmation operation is a strict check for detecting a coin remaining in the cassette 3 without fail. The second confirmation operation is performed, for example, for 15 seconds.

As a result of the second confirmation operation, when the sensor 38 does not detect any coins, it can be determined without fail that no coins remain, and when the sensor 38 detects a coin, it can be determined that a coin remains.

Therefore, when the sensor 38 does not detect any coins during the second confirmation operation (No in S15), the control unit 26 operates the coin supply unit 20, following the second confirmation operation, to supply coins from the coin supply unit 20 to the cassette 3 (S5).

When the sensor 38 detects a coin during the second confirmation operation (Yes in S15), the control unit 26 generates a signal to notify that a coin has been detected, and transmits this signal to the notification apparatus. The notification apparatus notifies that a coin has been detected upon receiving this signal (S12). Subsequent operations are as described above.

The coin handling apparatus 2 according to the present disclosure that operates as described above has advantages as follows. When, for example, it is necessary to continuously send a change funds to a plurality of empty cassettes 3, such as during the time period for making preparations for starting day's business, such a coin handling apparatus can complete the supply of coins to each cassette 3 in a short time. Specifically, the supplying of coins is started in the following cases: when a predetermined condition is satisfied, no operation is performed for confirming whether or not the cassette 3 is empty; and even when the predetermined condition is not satisfied, only a simple check, which is completed in a much shorter time than the strict check, is performed. Therefore, the waiting time for the transferring of coins for each cassette 3 can be shortened, and preparations for starting a day's business can be quickly made. Even when there is only one empty cassette 3 waiting for the supplying of coins, coins can be supplied without performing a strict check, as long as no error occurs while coins are being supplied. Therefore, the supply of coins can also be completed in a short time for only one empty cassette 3.

The present disclosure is not limited to the embodiment described above, and various modifications can be made without departing from the spirit of the present disclosure.

Figure 5:
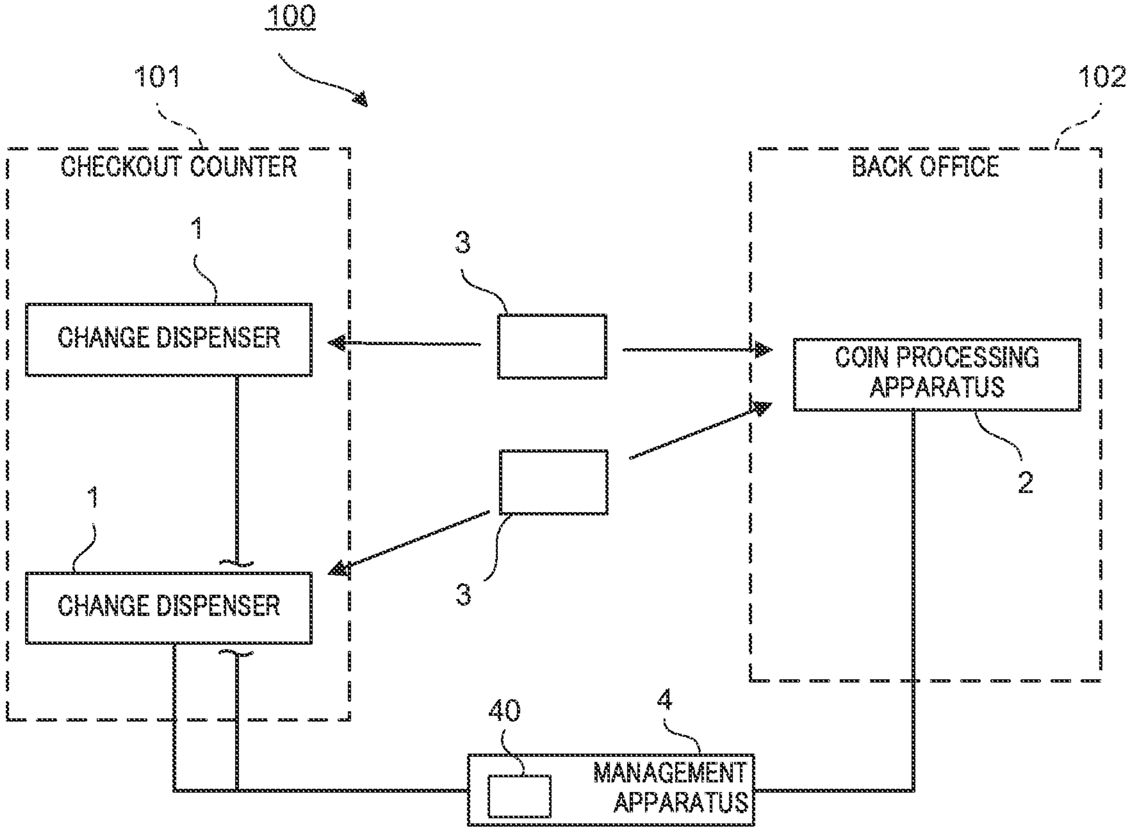
FIG. 5 is a schematic diagram illustrating a coin handling system according to an variation.

For example, the coin handling system 100 may further comprise a management apparatus 4, as illustrated in FIG. 5. The management apparatus 4 is a computer such as a server communicably connected to the change dispensers 1 and the coin handling apparatus 2 via a network or the like. The cassette 3 does not comprise a memory 40, but management apparatus 4 does. In this case, when coins are transferred from the cassette 3 to the coin handling apparatus 2 to empty the cassette 3, the management apparatus 4 may receive the date and time when the emptying of the cassette 3 was performed and the number specifying the coin handling apparatus 2 from the coin handling apparatus 2 and write the information in the memory 40. For determining whether or not the predetermined condition is satisfied, the control unit 26 of the coin handling apparatus 2 may acquire information necessary for the determination from the management apparatus 4. The management apparatus 4 may acquire the ID of and the inventory amount in the cassette 3 from the change dispenser 1 or the coin handling apparatus 2, and cause the memory 40 to store the ID and inventory amount regarding the cassette 3 in association with each other. For deciding whether or not the inventory amount in the cassette 3 is 0, the control unit 26 of the coin handling apparatus 2 may acquire the ID from the attached cassette 3 and acquire the inventory amount associated with the acquired ID from the memory 40 of the management apparatus 4.

For transferring coins to the cassette 3, the change dispenser 1 may associate the ID and inventory amount regarding the cassette 3 with each other and store the ID and inventory amount in a memory comprised in the change dispenser 1. The coin handling apparatus 2 may be communicably connected to the change dispenser 1. In this case, for deciding whether or not the inventory amount in the cassette 3 is 0, the control unit 26 of the coin handling apparatus 2 may acquire the ID from the attached cassette 3 and acquire the inventory amount associated with the acquired ID from the memory of the change dispenser 1. For transferring coins to the cassette 3, the change dispenser 1 may associate the ID and inventory amount regarding the cassette 3 with each other and transmit the ID and inventory amount to the coin handling apparatus 2. The coin handling apparatus 2 may associate the received ID and inventory amount regarding the cassette 3 with each other and store the ID and inventory amount in a memory comprised in the coin handling apparatus 2. In this case, for deciding whether or not the inventory amount in the cassette 3 is 0, the control unit 26 of the coin handling apparatus 2 may acquire the ID from the attached cassette 3 and acquire the inventory amount associated with the acquired ID from the memory of the coin handling apparatus 2.

INDUSTRIAL APPLICABILITY

The present disclosure are applicable in various industrial fields that handle coins, such as distribution and finance.

REFERENCE SIGNS LIST

1 Change dispenser
2 Coin handling apparatus
3 Cassette
4 Management apparatus
20 Coin supply unit
21 Deposit unit
22 Rotating disc
23 Transport unit
24 Diversion unit
25 Recognition unit
26 Control unit
27 Storage unit
28 Discharge unit
29 Cassette attachment unit
30 Storage space
31 Housing
32 Inlet
33 Inlet shutter
34 Outlet
35 Outlet shutter
36 Conveyor
37 Fall prevention plate
38 Sensor
39 Detection area
40 Memory

100 Coin handling system
101 Checkout counter
102 Back office

What is claimed is:

1. A coin handling apparatus, comprising:
a cassette attachment unit where a cassette is configured to be attached;
a coin supply unit configured to supply a coin to the cassette; and
a control unit that
causes the cassette attached to the cassette attachment unit to perform a first confirmation operation when the cassette does not satisfy a predetermined condition, the first confirmation operation being an operation for confirming that a coin remains in the cassette, and
operates the coin supply unit to supply a coin to the cassette attached to the cassette attachment unit without causing the cassette to perform the first confirmation operation when the cassette satisfies the predetermined condition, wherein:
the cassette comprises a conveyor configured to transport a coin in the cassette and a sensor configured to detect a coin in the cassette; and
the first confirmation operation is an operation of the conveyor for transporting a coin to a detection area of the sensor.

2. The coin handling apparatus according to claim 1, wherein
when an error occurs in the coin supply unit or the cassette while a coin is being supplied from the coin supply unit to the cassette, the control unit causes the cassette to perform a second confirmation operation different from the first confirmation operation, the second confirmation operation being for confirming that a coin remains in the cassette.

3. The coin handling apparatus according to claim 2, wherein
the second confirmation operation comprises an operation of the conveyor for transporting a coin in a first direction toward the detection area of the sensor and an operation of the conveyor for transporting a coin in a second direction different from the first direction.

4. The coin handling apparatus according to claim 1, wherein
the control unit is configured to acquire an inventory amount in the cassette; and
when the sensor detects a coin as a result of the first confirmation operation even though the inventory amount is 0, the control unit generates a signal to notify that a coin has been detected.

5. The coin handling apparatus according to claim 4, wherein
the control unit is configured to acquire the inventory amount from a memory comprised in the cassette.

6. The coin handling apparatus according to claim 1, wherein
the predetermined condition is a condition such that the cassette is attached to the cassette attachment unit within a predetermined time after last emptying of the cassette.

7. The coin handling apparatus according to claim 1, wherein
the predetermined condition is a condition such that the cassette is attached to the cassette attachment unit of the coin handling apparatus having last emptied the cassette.

8. A coin handling method that is performed by a coin handling apparatus configured to supply a coin to a cassette, the coin handling method comprising:
determining whether or not the cassette attached to a cassette attachment unit satisfies a predetermined condition;
causing the cassette to perform a first confirmation operation when the cassette does not satisfy a predetermined condition, the first confirmation operation being an operation for confirming that a coin remains in the cassette; and
supplying a coin to the cassette without causing the cassette to perform the first confirmation operation when the cassette satisfies the predetermined condition, wherein:
the cassette comprises a conveyor configured to transport a coin in the cassette and a sensor configured to detect a coin in the cassette; and
the first confirmation operation is an operation of the conveyor for transporting a coin to a detection area of the sensor.

* * * * *